United States Patent [19]
van de Kraats et al.

[11] 3,957,659
[45] May 18, 1976

[54] CRUDE OIL COMPOSITIONS HAVING IMPROVED LOW TEMPERATURE FLOW PROPERTIES

[75] Inventors: Eduard J. van de Kraats; Arnold A. Buitelaar, both of Amsterdam, Netherlands

[73] Assignee: Shell Oil Company, Houston, Tex.

[22] Filed: July 2, 1973

[21] Appl. No.: 376,067

Related U.S. Application Data

[63] Continuation-in-part of Ser. No. 152,399, June 11, 1971, abandoned.

[30] Foreign Application Priority Data
Mar. 5, 1971 United Kingdom............... 6132/71

[52] U.S. Cl................................ 252/8.3; 137/13; 166/304; 252/8.55 B; 252/51.5 A
[51] Int. Cl.².................. E21B 43/12; C09K 3/00

[58] Field of Search........... 252/8.3, 8.55 B, 8.55 R, 252/51.5 A; 166/304; 137/13

[56] References Cited
UNITED STATES PATENTS

| | | | |
|---|---|---|---|
| 2,204,967 | 6/1940 | Moser............................. | 252/8.3 X |
| 2,364,222 | 12/1944 | Kaufman.......................... | 252/8.55 |
| 2,839,512 | 6/1958 | Barnum et al................. | 252/51.5 X |
| 3,669,189 | 6/1972 | Fischer........................... | 166/304 X |
| 3,776,247 | 12/1973 | Choufoer et al.................. | 137/13 |

*Primary Examiner*—Herbert B. Guynn

[57] ABSTRACT

The flow properties of waxy crude oils are improved by the incorporation therein of a copolymer of (1) an olefinically unsaturated compound containing a long hydrocarbon side chain and (2) an olefinically unsaturated heterocyclic nitrogen-containing compound, e.g., 4-vinyl pyridine.

7 Claims, No Drawings

3,957,659

CRUDE OIL COMPOSITIONS HAVING IMPROVED LOW TEMPERATURE FLOW PROPERTIES

CROSS-REFERENCE TO RELATED APPLICATIONS

This is a continuation-in-part of applicant's copendng application, Ser. No. 152,399, filed June 11, 1971, now abandoned.

BACKGROUND OF THE INVENTION

The invention relates to the improvement of the flow properties of waxy crude oils.

Dependent on the field of production, crude oils may contain considerable quantities of wax, e.g., from 6 to 20% by weight or more. This wax gradually separates when the oil is cooled to below a certain temperature. The coherence of the separated wax crystals in spatial structures imparts a certain stiffness to the oil. At sufficiently low temperatures the oil may even completely solidify. As will be explained below, the presence of crystallized wax in crude oil has a detrimental effect on the flow properties and handleability of the oil.

When crude oil is produced from a well which passed through strata of lower temperatures than that of the oil-bearing formation, the oil coming into contact with the cold wall of the well may stiffen, which interferes with its transport to the surface. If production is temporarily interrupted, the oil may even solidify completely, which involves serious problems when production is resumed.

When oil is stored in tanks which are not provided with heating facilities or insulation, the oil in contact with the cold walls and bottom of the tank will cool down and, as a result, may stiffen. This leads to difficulties in pumping the oil from the tank; in fact, considerable quantities of stiffened oil may thus remain behind, which reduces the effective capacity of the tank.

This problem acquires even greater importance during transport of waxy crude oil in unheated tankers, where the walls of the compartments are partly formed by the ship's hull which is in direct contact with cold sea water. Large quantities of stiffened oil remaining behind when the tanker is discharged, reduce the carrying capacity of the ship; in addition, subsequent cargoes of crude oil may become contaminated.

The poorer flow properties of the oil at lower temperatures will also considerably interfere with the transport of the oil through a pipeline, either by pumping or by flow under the influence of prevailing pressure or level differences.

When waxy crude oils are pumped through a pipeline, high flow resistances can build up, thus increasing pumping requirements. This can lead to high cost of transport, particularly in long-distance pipelines. If the resistance is very high, the available discharge pressure of the pump or the maximum permissible pressure determined by the strength of the pipe may be insufficient, so that the crude oil cannot be pumped.

If pumping is interrupted when the waxy crude oil is in the pipeline, the oil, which is often warmer than the surroundings, will cool down. The wax separated during cooling can freely form a spatial structure, which may extend over the entire cross section of the pipe and requires a very high pump pressure to be broken. If this pressure exceeds the available or permissible discharge pressure, transport cannot be resumed.

When a waxy crude is pumped through a pipeline as well as when it remains still, the oil may solidify on the cold pipe wall to form a deposit which remains behind. This reduces the capacity of the pipeline and entails the risk of contamination of subsequent batches of crude oil which have to be pumped through the pipeline.

Certain operations of crude oil refining, such as separation of water or sediment, for example by means of settling, centrifuging, filtration or coalescence, require the oil to be thin-liquid. If, owing to the presence of crystallized wax, the flow of the oil is insufficient, there is a possibility that these operations cannot be carried out at all or only to a limited extent. Good flow properties of a crude oil are desired not only for transport and storage, but also for many other reasons. In this connection, for example, mention may be made of sampling, the transmittance of pressure signals through narrow lines and the proper functioning of automatic equipment installed in refineries and along pipelines for purposes such as temperature and density measurements.

Thus it can be seen that the flow properties of a crude oil play a great part both during production and upon storage, transport and refining of the oil. It is therefore very important to minimize the adverse effect of wax on the flow properties of the oil.

To predict the flow behavior of a crude oil under operational conditions, laboratory-scale measurements of its pour point, which is regarded as characteristic of the flow behavior of the oil, is often carried out. The point is considered to be a criterion of the lowest permissible temperature during storage or transport or during a possible interruption of transport. Compounds are known which, when present in a crude oil, lower the pour point of that oil. For example, various homo- and copolymers containing aliphatic hydrocarbon side chains of at least 14 carbon atoms are disclosed for this purpose in Netherlands Application No. 6,709,453. British Pat. No. 1,154,966 discloses similar polymers as flow improvers in residual fuels.

The pour point of crude oil is usually determined according to a standardized procedure, involving cooling of the oil at a rate of about 0.5°C/min (= 30°C/hr). In actual practice, such as in pipeline transport or during shut-down of the pipeline, much slower cooling rates are frequently experienced, e.g., cooling rates of 5°C/hr or less. It has been found that under these conditions the above-mentioned known polymers do not have the desired beneficial influence on the temperature at which the crude oil stiffens, and consequently the crude oil can no longer be easily transported.

A type of compound has now been found, which, when incorporated in a waxy crude oil, not only lowers the stiffening temperature at high cooling rates, but also at the lower cooling rates frequently encountered in the field.

SUMMARY OF THE INVENTION

It has now been found that the flow properties of a waxy crude oil can be substantially improved by incorporating therein a minor amount of one or more copolymers of (1) an olefinically unsaturated compound containing a long hydrocarbon side chain and (2) an olefinically unsaturated heterocyclic nitrogen-containing compound. It has been further found that copolymers of the above-mentioned olefinically unsaturated long chain hydrocarbon compounds with 4-vinyl pyridine possess unique properties with regard to depressing the pour point of waxy crudes, particularly those which have been subjected to slow cooling.

DETAILED DESCRIPTION OF THE INVENTION

In accordance with the invention, a crude oil composition is provided which comprises a waxy crude oil and a polymer containing heterocyclic rings and aliphatic hydrocarbon side chains with at least 14 carbon atoms.

For the sake of brevity the terms "long hydrocarbon chains" and "long hydrocarbon side chains" will be used hereinafter to designate aliphatic hydrocarbon chains and aliphatic hydrocarbon side chains with at least 14 carbon atoms, respectively.

The polymers according to the invention consist of those which have been obtained by copolymerization of olefinically unsaturated compounds. Preferred polymers include those which contain long hydrocarbon side chains which are unbranched and saturated. That is, alkyl groups represented by the formula $CH_3-(CH_2-)_n-CH_2$, in which $n > 12$. For practical applications, preference is given to polymers containing alkyl side chains of from 14 to 30 carbon atoms, in particular, those having from 16 to 26 carbon atoms.

Structurally, the polymers in accordance with the invention consist of a main chain built up of carbon atoms, which main chain carries heterocyclic rings and long hydrocarbon side chains. The long hydrocarbon side chains and/or the heterocyclic rings may be attached either directly or indirectly to the main chain. Preference is given to polymers wherein the long hydrocarbon side chains are attached indirectly to the main chain, via one or more oxygen and/or carbon atoms. Some examples of polymers wherein the aliphatic hydrocarbon side chains are attached indirectly to the main chain via one or more oxygen and/or carbon atoms are polymers wherein the aliphatic hydrocarbon side chains are attached to the main chain via a carboxyl group or via an oxygen atom. It is preferred that the heterocyclic ring is attached directly to the main chain.

The preparation of such polymers may be carried out by any of several methods. For example, the polymers can be prepared by copolymerization of the olefinically unsaturated compounds containing long hydrocarbon chains directly with the olefinically unsaturated heterocyclic nitrogen-containing compound. A second manner is which these polymers can be prepared is by copolymerization of olefinically unsaturated compounds which do not contain any long hydrocarbon chain and/or heterocyclic rings, with after-treatment of the polymer to introduce the long hydrocarbon chains and/or heterocyclic rings into the polymer.

As a matter of course, polymers which contain several types of long hydrocarbon side chains (e.g. with different amounts of carbon atoms) and/or different heterocyclic rings can also be used. Depending upon the nature of the paraffin waxes present in the crude oil, it is frequently desirable to employ copolymers which contain long hydrocarbon side chains of differing carbon number.

The molecular weight of the polymers applicable as flow improvers in the crude oil composition according to the invention may vary between wide limits. For practical applications, preference is given to copolymers having an average molecular weight (number average $M_n$) of between 1,000 and 1,000,000, in particular between 4,000 and 100,000.

As hereinbefore mentioned, 4-vinyl pyridine forms particularly advantageous copolymers with olefinically unsaturated compounds containing long hydrocarbon chains. Some examples of olefinically unsaturated compounds containing long hydrocarbon chains which can be suitably employed to prepare the present copolymers are vinyl esters and allyl esters of saturated monocarboxylic acids, such as vinyl esters and allyl esters of arachidic acid and behenic acid; alkyl esters of olefinically unsaturated $C_3$ to $C_4$ monocarboxylic acids, such as n-octadecyl acrylate and n-eicosyl methacrylate; alkylamides of unsaturated monocarboxylic acids such as n-eicosyl acrylamide and n-docosyl methacrylamide; dialkyl esters of unsaturated dicarboxylic acids, such as di-n-octadecyl maleate and di-n-docosyl fumarate; dialkyl amides of unsaturated dicarboxylic acids, such as di-n-eicosyl-maleic diamide and di-n-deocsylfumaric diamide; imides of unsaturated dicarboxylic acids, such as n-octadecylmaleic acid imide and n-icosylmaleic acid imide; alkyl vinyl ethers, such as n-docosylvinyl ether and n-tetracosyl vinyl ether and mono-olefins such as 1-octacosene and 1-docosene. Of the foregoing, alkyl esters of olfinically unsaturated $C_3$ to $C_4$ monocarboxylic acids, e.g., alkyl acrylates, and alkyl methacrylates, are preferred.

If desired, olefinically unsaturated compounds which have no long hydrocarbon chains may be incorporated in the polymers, for instance, vinyl esters of unsaturated monocarboxylic acids, such as vinyl acetate, alkyl esters of unsaturated mono- and dicarboxylic acids, such as methyl methacrylate and diethyl maleate, alkyl vinyl ethers, such as octyl vinyl ether and mono-olefins, such as ethene and isobutene.

The ratio between the number of long hydrocarbon side chains and the number of heterocyclic (e.g., pyridine) rings present in the copolymers according to the invention may vary between side limits, e.g., from about 1:1 to about 20:1. Very suitably this ratio is from about 2:1 to about 10:1.

The concentration in which the polymers may be applied in the waxy crude oils may vary between wide limits depending upon the nature, structure and molecular weight of the polymer to be employed, as well as the nature and quantity of the paraffin waxes present in the crude oil, and the improvement of the flow properties sought. In some instances a quantity of 0.001%w, (percent by weight) calculated on the crude oil composition, is sufficient for attaining the desired improvement in flow properties. In most cases, a quantity of 2.0%w is amply sufficient. Preferably, from 0.002 to 0.2%w of the polymer is incorporated into the crude oil.

The waxy crude oil to which the polymers according to the invention may be added, may consist of one waxy crude oil or a mixture of waxy crude oils. If desired, the polymers can also be incorporated in mixtures consisting of one or more waxy crude oils and one or more non-waxy crudes.

The present polymers, which are particularly important as additives to ease the transport of waxy crude oils through pipelines, by tankers or by other means, can also be very suitably used in oil wells producing waxy crude to prevent the formation of waxy deposits or to dissolve such deposits formed on the walls of the well.

If desired, besides the present polymers, other types of polymers which influence the flow properties, may be incorporated in the waxy crude oil. As examples may be mentioned polymers containing aliphatic hydrocarbon chains with at least 14 carbon atoms (such as polyalkyl acrylates and copolymers of vinyl acetate and docosyl fumarate, and copolymers of ethylene and olefinically unsaturated monomers with paraffinic side chains with at most 10 carbon atoms (such as copolymers of ethylene and vinyl acetate).

EXAMPLE I

Two copolymers of alkyl acrylates and 4-vinylpyridine were prepared.

In the starting mixture for the preparation of polymer A the alkyl acrylates consisted of a mixture of eicosyl and docosyl acrylates with an average alkyl side chain length of 21 carbon atoms. The polymerization was carried out by radical copolymerization with programmed addition of the 4-vinylpyridine, until 70% of the alkyl acrylates had polymerized. The ratio of alkyl acrylates to 4-vinylpyridine in copolymer A was 1:0.3. The number average molecular weight was 40,000.

Polymer B was prepared by polymerization of a mixture of 4-vinylpyridine, eicosyl acrylate and docosyl acrylate (average alkyl side chain length of the alkyl acrylates 21.5 carbon atoms) until 10%w of the monomers had been converted to polymer. The ratio of alkyl acrylates to 4-vinylpyridine in polymer B was 1:0.3, the number average molecular weight was 40,000.

For comparison, a copolymer C of stearyl acrylate, eisocyl acrylate and docosyl acrylate (average side chain length 20 carbon atoms) with number average molecular weight 60,000 was prepared.

A North African waxy crude oil, which had been stored for several weeks at room temperature, was heated to a certain temperature (the reheat temperature). The polymer was added in an amount of 400 ppm at the doping temperature, which in two cases was equal to the reheat temperature and in one case 10°C lower. The pour points were determined using two cooling rates. In the first series of experiments the cooling rate as described in ASTM D 97-66 was used, viz. a cooling rate of approximately 0.5°C/min (= 30°C/hr). In the second series of experiments the cooling rate was reduced to 5°C/hr and the last temperature where the oil was seen to flow (as defined in ASTM method D97-66) was taken as the pour point. The data in Table I show that with relatively fast cooling, the effect of the polymers A and B on the pour point was equal or superior to that of polymer C and a commercial pour point depressant D. With slow cooling (second series of experiments) the decrease in pour point obtained with the polymers A and B according to the invention was much greater than that of polymers C and D.

Table I

| Reheat temperature, °C | 50 | 50 | 40 |
|---|---|---|---|
| Doping temperature, °C | 50 | 40 | 40 |
| | Pour Point °C | | |
| Cooling) waxy crude oil | 24 | 24 | 24 |
| rate) waxy crude oil + 400 ppm C | 21 | 12 | 9 |
| 30°C/hr) waxy crude oil + 400 ppm D | 21 | 24 | 15 |
| ) waxy crude oil + 400 ppm A | 12 | 12 | 12 |
| ) waxy crude oil + 400 ppm B | 12 | 12 | 12 |
| cooling) waxy crude oil | 24 | 24 | 24 |
| rate) waxy crude oil + 400 ppm C | 24 | 24 | 21 |
| 5°C/hr) waxy crude oil + 400 ppm D | 21 | 21 | 12 |
| ) waxy crude oil + 400 ppm A | 0 | 0 | <-3 |
| ) waxy crude oil + 400 ppm B | 6 | 6 | 6 |

EXAMPLE II

To further demonstrate the outstanding properties of copolymers prepared with 4-vinyl pyridine in improving the flow propertis of waxy crude oil, four copolymers were prepared by polymerizing various heterocyclic and aromatic comonomers with alkyl acrylates having an average chain length as shown in Table 2 (Copolymers E,F,G and H) and their pour point depressing activity compared to a copolymer of 4-vinyl pyridine with alkyl acrylates of similar chain length (Copolymer I). The crude oil employed in this series of tests was Sarir crude having a specific gravity of 0.839 kg/liter, a wax content of 12.6%w and a pour point after slow cooling (3°C/day) of 24°C. The concentration of each of the additives in the crude oil composition was 400 ppm. The samples were doped at a temperature of 30°C. The pour points of the crude oil compositions containing the respective copolymers after slow cooling are shown in Table 2. The cooling rate employed was 3°C per day, in contrast to the ASTM described cooling rate (ASTM 97-66) of 0.5° C/min.

Table 2

| Polymer | Molecular Weight $M_n$ | Alkyl Acrylate (Alkyl chain length) | Comonomer | Mole Fraction of Alkyl Acrylates | Concentration in Crude Oil, ppm | Pour Point After Slow Cooling, °C |
|---|---|---|---|---|---|---|
| E | 60,000 | 20.5 | vinyl toluene | 0.49 | 400 | 24 |
| F | 60,000 | 19.5 | 2-vinyl pyridine | 0.62 | 400 | 21 |
| G | 60,000 | 19.5 | 5-ethyl,2-vinyl-pyridine | 0.71 | 400 | 24 |
| H | 60,000 | 19.5 | styrene | 0.59 | 400 | 24 |
| I | 60,000 | 19.5 | 4-vinyl pyridine | 0.67 | 400 | 0 |

From the foregoing table, it can be seen that copolymers prepared with 4-vinyl pyridine have markedly superior pour point depressing activity in crude oils which have been subjected to slow cooling (of the type likely to be encountered in actual service) as compared to copolymers prepared with closely related vinyl pyridines e.g., 2-vinyl pyridine and 5-ethyl, 2-vinyl pyridine; or copolymers prepared with olefinically unsaturated aromatic comonomers.

What is claimed is:

1. A crude oil composition having improved low-temperature flow properties upon exposure to cooling at a rate not exceeding 5°C per hour which comprises a waxy crude oil having a wax content of 6–20% weight and having incorporated therein from 0.001 to 2.0% by weight of a copolymer of (1) a $C_{14}$ to $C_{30}$ alkyl ester of acrylic or methacrylic acid and (2) 4-vinyl pyridine, the ratio of alkyl side chains to pyridine rings being from about 1:1 to about 20:1 and the copolymer having a number average molecular weight of between 1,000 and 1,000,000.

2. The composition of claim 1 wherein the copolymer is a copolymer of a $C_{14}$ to $C_{30}$ alkyl acrylate and 4-vinyl pyridine.

3. The composition of claim 2 wherein the amount of copolymer incorporated into the crude oil is from 0.002 to 0.2% by weight.

4. The composition of claim 2 wherein the ratio of alkyl side chains to pyridine rings is from about 2:1 to about 10:1.

5. The composition of claim 4 wherein the copolymer is a copolymer of a $C_{16}$ to $C_{26}$ alkyl acrylate and 4-vinyl pyridine.

6. The composition of claim 5 wherein the number average molecular weight of the copolymer is between 4,000 and 100,000.

7. The composition of claim 6 wherein the amount of copolymer incorporated into the crude oil is from 0.002 to 0.2% by weight.

* * * * *